(12) United States Patent
Lehmann et al.

(10) Patent No.: US 8,786,601 B2
(45) Date of Patent: Jul. 22, 2014

(54) GENERATING VIEWS OF MEDICAL IMAGES (75) Inventors: Helko Lehmann, Aachen (DE); Juergen Weese, Aachen (DE); Sabri Boughorbel, Eindhoven (NL); Yuechen Qian, Briarcliff Manor, NY (US); Merlijn Sevenster, Eindhoven (NL); Eric Zachery Silfen, Andover, MA (US)

(73) Assignee: Koninklijke Philips N.V., Eindhoven (NL)

( * ) Notice: Subject to any disclaimer, the term of this patent is extended or adjusted under 35 U.S.C. 154(b) by 208 days.

(21) Appl. No.: 13/133,407

(22) PCT Filed: Dec. 15, 2009

(86) PCT No.: PCT/IB2009/055765
§ 371 (c)(1),
(2), (4) Date: Oct. 25, 2011

(87) PCT Pub. No.: WO2010/070585
PCT Pub. Date: Jun. 24, 2010

(65) Prior Publication Data
US 2012/0098838 A1    Apr. 26, 2012

Related U.S. Application Data

(60) Provisional application No. 61/138,600, filed on Dec. 18, 2008.

(51) Int. Cl.
*G06T 15/10* (2011.01)
*G06T 15/00* (2011.01)
*G06K 9/00* (2006.01)
*G06K 9/32* (2006.01)

(52) U.S. Cl.
USPC ........... 345/427; 345/419; 382/128; 382/131; 382/293; 382/294

(58) Field of Classification Search
CPC .......... A61N 1/36082; A61N 1/36128; A61N 1/37247; G06F 19/321; G06F 19/3406; G06F 19/3437; G06K 2209/00; G06K 2209/05; G06T 7/028; G06T 7/003; G06T 7/0032; G06T 2207/30016
USPC .......... 345/419–427, 501; 382/128, 131, 284, 382/293, 249
See application file for complete search history.

(56) References Cited

U.S. PATENT DOCUMENTS

| 4,945,476 A | 7/1990 | Bodick et al. |
| 6,950,542 B2 * | 9/2005 | Roesch et al. ................ 382/128 |

(Continued)

FOREIGN PATENT DOCUMENTS

| WO | 0211035 A1 | 2/2002 |
| WO | WO 2007058632 A1 * | 5/2007 |
| WO | 2008016530 A2 | 2/2008 |

OTHER PUBLICATIONS

Jannin, Pierre, et al. "Validation of medical image processing in image-guided therapy." IEEE Transactions on Medical Imaging 21.12 (2002): 1445-9.*

(Continued)

*Primary Examiner* — Xiao Wu
*Assistant Examiner* — Michael J Cobb (57) ABSTRACT

A system for generating a view of a medical image comprises an input (1) for receiving information indicative of a suspected diagnosis of a patient. An input (2) for receiving a medical image of the patient. A mapper (3) for mapping the suspected diagnosis of the patient to a set of viewing parameters for viewing the medical image. A view generator (8) for providing a view of the medical image in accordance with the set of viewing parameters. A database (4) for mapping a suspected diagnosis into a set of generic viewing parameters. A transformer (5) for transforming the set of generic viewing parameters into a set of image-specific viewing parameters based on content of the medical image.

12 Claims, 6 Drawing Sheets

(56) References Cited

U.S. PATENT DOCUMENTS

| | | | |
|---|---|---|---|
| 2001/0043729 A1* | 11/2001 | Giger et al. | 382/128 |
| 2002/0021828 A1* | 2/2002 | Papier et al. | 382/128 |
| 2002/0196249 A1* | 12/2002 | Peters et al. | 345/419 |
| 2006/0008130 A1* | 1/2006 | Yamamichi et al. | 382/128 |
| 2006/0242143 A1* | 10/2006 | Esham et al. | 707/6 |
| 2006/0280347 A1* | 12/2006 | Shirahata et al. | 382/128 |
| 2009/0175417 A1* | 7/2009 | Sasano | 378/98.5 |
| 2010/0189317 A1* | 7/2010 | Lehmann et al. | 382/128 |

OTHER PUBLICATIONS

Ezquerra, N., et al. "Interactive, knowledge-guided visualization of 3D medical imagery." Future Generation Computer Systems 15.1 (1999): 59-73.*

Rorden, Chris, and Matthew Brett. "Stereotaxic display of brain lesions." Behavioural Neurology 12 (2000): 191-200.*

Paul M. Thompson, Michael S. Mega, Katherine L. Narr, Elizabeth R. Sowell, Rebecca E. Blanton, Arthur W. Toga, Brain Image Analysis and Atlas Construction 2000, Handbook of Medical Imaging, SPIE Press, Bellingham, WA, pp. 1063-1131.*

Paul M. Thompson, Arthur W. Toga, A Framework for Computational Anatomy, 2002, Computing and Visualization in Science, 5:13-34, (DOI) 10.1007/s00791-002-0084-6.*

Arthur W. Toga, Paul M. Thompson, Katherine L. Narr, Elizabeth R. Sowell, Probabilistic Brain Atlases of Normal and Diseased Populations, 2005, Databasing the Brain: From Data to Knowledge, Eds Steven Koslow and Shankar Subramaniam, ISBN: 978-0-471-30921-5, Chapter 25, pp. 1-36.*

Arthur W. Toga, Paul M. Thompson, Brain Atlases of Normal and Diseased Populations, 2005, International Review of Neurobiology, 66:1-54, DOI: 10.1016/S0074-7742(05)66001-1.*

Huang, Y., et al.; A Pilot Study of Contextual UMLS Indexing to Improve the Precision of Concept-based Representation in XML-structured Clinical Radiology Reports; 2003; J. American Medical Informatic Assoc.; 10(6) 580-587.

Zeng, Q., et al.; A Knowledge-based, Concept-oriented View Generation System for Clinical Data; 2001; J. Biomedical Informatics; 34:112-128.

Zeng, Q., et al.; Providing Concept-oriented Views for Clinical Data using a Knowledge-based System: An Evaluation; 2002; J. American Medical Informatic Assoc.; 9:294-305.

* cited by examiner

GENERATING VIEWS OF MEDICAL IMAGES

FIELD OF THE INVENTION

The invention relates to generating a view of a medical image.

BACKGROUND OF THE INVENTION

As medical imaging technologies advance, more and more image data sets are acquired by medical scanners to facilitate the diagnosis. For a given patient, based on information collected about the patient, the clinician has the task of establishing a diagnosis of the patient. To this end, the clinician may have a hypothetical diagnosis he wishes to confirm or reject, based on results of patient examination, such as medical images or laboratory results. In the case of medical images, the clinician maps the hypothesis into image findings which can help in confirming or rejecting the diagnosis. To obtain the image findings, the clinician not only needs to acquire the necessary medical images, using an imaging modality such as x-ray, CT, or MR, but he also needs to generate appropriate views of the acquired medical image data. Such views may be generated using an image processing system. Such view generation may include manually setting appropriate contrast and brightness levels, zoom levels, and panning, for example. Three-dimensional image data may need to be processed to create, for example, a slice view, multi-planar reformat view, or a perspective view from a particular perspective. In this process, the manual generation of views can be very time-consuming. For example, to diagnose a particular type of cancer, the necessary image findings may include vessel enhancement in a specific region of an organ. To be able to obtain such image findings from a 3D medical image, the clinician would have to create appropriate cross-sectional views or 3D rendered views showing the particular vessels within the organ. These steps may be time-consuming.

SUMMARY OF THE INVENTION

It would be advantageous to have an improved system for generating a view of a medical image. To better address this concern, in a first aspect of the invention a system is presented that comprises
  an input for receiving information relating to a suspected diagnosis of a patient;
  an input for receiving a medical image of the patient;
  a mapper for mapping the suspected diagnosis of the patient to a set of viewing parameters for viewing the medical image; and
  a view generator for providing a view of the medical image in accordance with the set of viewing parameters.

The system thus provides a view of the medical image which is associated, via the set of viewing parameters, with the suspected diagnosis. By automatically generating a view relevant to a suspected diagnosis, the burden of manually generating the view for confirming or rejecting that diagnosis is taken away from the clinician. Accordingly, the viewing of medical images for performing diagnoses becomes more efficient because fewer manual operations are needed. Moreover, the view generation may become more consistent because the views are provided automatically.

The mapper may comprise a database for mapping a suspected diagnosis into a set of generic viewing parameters, and a transformer for transforming the set of generic viewing parameters into a set of image-specific viewing parameters, based on the content of the medical image. In many cases, the desired view is only available relative to some aspect of the image content. The mapping table and the transformer make the viewing parameters image-specific, taking this image content into account. This allows providing more accurate views enabling a particular suspected diagnosis to be confirmed or rejected.

The generic viewing parameters may be defined in respect of an image model, and the transformer may comprise
  a model adapter for adapting the image model to the medical image, for obtaining a set of adaptation parameters; and
  a parameter adapter for adapting the set of generic viewing parameters to the set of image-specific viewing parameters, based on the set of adaptation parameters.

The generic viewing parameters can be expressed in respect of an image model, which is a relatively robust and intuitive way to express the generic viewing parameters.

The model may comprise a shape model. Shape models are suitable for example to localize an object which is expected to be present in the image. By defining the generic viewing parameters relative to the shape model, they can be expressed relative to the object which is to be expected in the image.

The generic viewing parameters may comprise a geometric parameter relative to the image model. Geometric image parameters are important aspects of a view. Defining them relative to the image model allows defining the geometric image parameters in a generic way applicable for many images that could be used for making the particular suspected diagnosis. For example, one or more of the generic viewing parameters are given in respect of a shape model.

An image finding-indicating means may be provided for indicating an image finding to which the view of the medical image is directed. This way, the user of the system is prompted with the image finding he could make with this view. It allows the user to understand the reason why the system has generated this view. Moreover, it makes it easy for the user to know what he should look for in the image. A suspected diagnosis-indicating means may be provided for indicating to a user a suspected diagnosis associated with the view of the medical image. This helps to remind the radiologist of the suspected diagnosis.

The mapper may be arranged for generating an ordered list of sets of viewing parameters; the output may be arranged for providing respective views of the medical image in accordance with the respective sets of viewing parameters, in the order defined by the ordered list. This allows efficient reviewing of a sequence of useful images which are relevant to making a diagnosis.

A medical imaging workstation may comprise the image processing system set forth.

A method of image processing may comprise
  receiving information relating to a suspected diagnosis of a patient;
  receiving a medical image of the patient;
  mapping the suspected diagnosis of the patient to a set of viewing parameters for viewing the medical image; and
  providing a view of the medical image in accordance with the set of viewing parameters.

A computer program product may be provided comprising computer executable instructions for causing a computerized system to perform the method set forth.

It will be appreciated by those skilled in the art that two or more of the above-mentioned embodiments, implementations, and/or aspects of the invention may be combined in any way deemed useful.

Modifications and variations of the image acquisition apparatus, of the workstation, of the method, and/or of the computer program product, which correspond to the described modifications and variations of the system, can be carried out by a person skilled in the art on the basis of the present description.

A person skilled in the art will appreciate that the method may be applied to multidimensional image data, e.g., to 2-dimensional (2-D), 3-dimensional (3-D) or 4-dimensional (4-D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

The invention is defined by independent claims. Advantageous embodiments are defined in the dependent claims.

BRIEF DESCRIPTION OF THE DRAWINGS

These and other aspects of the invention will be further elucidated and described with reference to the drawing, in which.

DETAILED DESCRIPTION OF EMBODIMENTS

For a given patient, based on the patient's data, in particular acquired medical image data sets and one or more initial hypotheses of a disease or diagnosis, the radiologist has to confirm or reject the hypotheses to derive a differential diagnosis. To this end, he maps a hypothesis to hypothesis-specific image findings that would confirm or reject such a hypothesis. If the clinician is able to demonstrate such an image finding, he may confirm the hypothesis, otherwise he may reject the hypothesis. Alternatively, the capability to demonstrate the presence of particular image findings may be part of a process of diagnosing a patient. To confirm or reject the presence of an image finding, the clinician generates appropriate views of the patient's data, and identifies the findings in the views. The generation of views of the patient data to verify image findings supporting or rejecting a given hypothesis is a time-consuming, largely manual process performed by the radiologist/doctor (reader).

To enable rapid view generation, a system may be provided that automatically maps hypotheses to appropriate viewing information for confirming or rejecting image findings. Such viewing information may contain, for example, projection information with respect to an anatomical model, a lookup table with respect to a tissue model and/or imaging protocol, fusing parameters for multiple images, or information instructing a computerized system to highlight certain structures when displaying a medical image.

The information to perform a mapping from a hypothesis into a particular way of displaying a medical image may be stored in a medical encyclopedia or database, which may be integrated in a medical image processing system.

Figure 1:
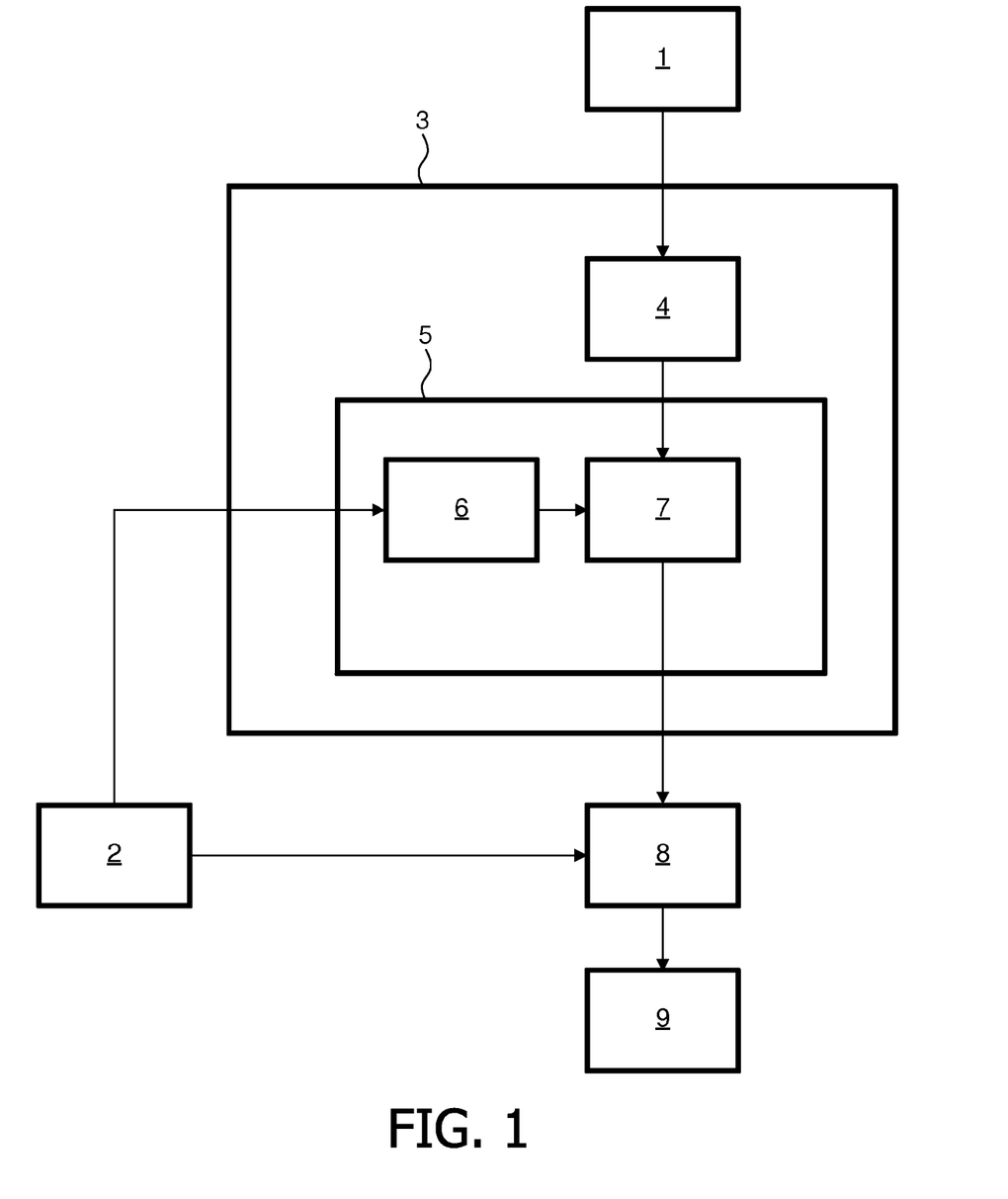
FIG. 1 shows a block diagram illustrating aspects of an image processing system.

FIG. 1 illustrates a system for generating a view of a medical image. One or more elements of the system may be implemented using software code-comprising instructions for being executed on a computerized system, such as a medical workstation, a personal computer, or a distributed medical image storage, retrieval, and visualization system such as a PACS. Such a computerized system comprises at least one processor which can execute the software code, and a storage means for storing the software code and/or the medical image data which is processed. Such a memory may comprise a RAM, a ROM, a hard drive, or removable media such as DVD media. Communication means may be provided for receiving and transmitting data over a communication link, such as a network, for example a LAN, a wide area network, a virtual private network, or the Internet. Data which may be transmitted over a network include information about a suspected diagnosis, medical image data, or sets of viewing parameters. Also, hardware may be provided to enable interaction with a human operator. Such hardware may comprise a mouse, a keyboard, and/or a display. The display may be used for displaying a view of a medical image stored in the storage means. The human interaction may include selecting a particular patient, and indicating a suspected diagnosis. Accordingly, an input 1 may be provided for receiving information indicative of a suspected diagnosis of a patient. Such a suspected diagnosis may also be referred to as a potential diagnosis, or hypothetical diagnosis, for example. The information may be obtained by enabling a user to indicate a suspected diagnosis. The information may also be derived from metadata accompanying a medical image dataset and relating to a particular imaging protocol, for example. The information may also be extracted from an electronic patient file.

An input 2 may be provided for receiving a medical image of the patient. As described above, the medical image may be obtained from a storage means or from a server via a network connection, for example. The medical image may also be obtained directly from a medical image acquisition apparatus.

A mapper 3 may be provided for mapping the suspected diagnosis of the patient to a set of viewing parameters for viewing the medical image. The set of viewing parameters is indicative of image processing techniques which the dedicated system applies to the medical image to generate a view of the image, the view of the image being relevant for enabling a physician to decide whether the suspected diagnosis is an accurate or incorrect diagnosis of the patient. For example, the mapper 3 may be arranged for providing parameters defining a specific cross-sectional plane of an image, said cross-sectional plane having a particular orientation and location within the image, and being indicative of a multiplanar reformat of the medical image.

A view generator 8 may be provided for providing a view of the medical image in accordance with the set of viewing parameters. In the example of parameters defining a specific cross-sectional plane, the view generator may be arranged for generating a multiplanar reformat of the medical image provided via the input 2, the multiplanar reformat corresponding to the cross-sectional plane as defined by the set of viewing parameters.

An output 9 may be provided for outputting the view of the medical image generated by the view generator 8. For example, the output 9 may be connected to a display for showing the view of the medical image on the display to a user. For example the user may be a radiologist or clinician.

The output 9 may also be arranged for storing the view provided by the view generator 8 and/or for storing the patient-specific viewing parameters generated by the mapper 3. The output 9 may also be arranged for transmitting the view or the patient-specific viewing parameters to another computer system, such as a server, for example for storing the data in a patient database.

The mapper 3 may comprise a database 4 for mapping a suspected diagnosis into a set of generic viewing parameters. Herein, generic viewing parameters may be viewing parameters that are independent of a particular patient or independent of the particular medical image of the patient. The generic viewing parameters allow a formal description of a view which is not patient-specific.

The mapper 3 may comprise a transformer 5 for transforming a set of generic viewing parameters into a set of image-specific viewing parameters. This transformation may be based on content of the medical image.

The database 4 may be arranged for mapping the suspected diagnosis into a set of generic viewing parameters defined in respect of an image model. The database may also be arranged for mapping the suspected diagnosis to an identification of the relevant image model. The transformer 5 may comprise a model adapter 6 for adapting the image model to the medical image. This adapting process may result in a set of adaptation parameters. The set of adaptation parameters may be representative of a difference between the image model and the medical image.

The transformer 5 may also comprise a parameter adapter 7 for adapting the set of generic viewing parameters to the set of image-specific viewing parameters, based on the set of adaptation parameters. Consequently, the set of adaptation parameters may be used to transform the set of generic viewing parameters into a set of image-specific viewing parameters.

The image model may comprise a shape model. The image model may, alternatively or additionally, comprise a model of image intensity levels occurring in the image, for example an average and/or standard deviation of the image intensity levels in part of the image or in the whole image. A histogram of at least part of the image may also be used as an image model. The generic viewing parameters may comprise one or more geometric parameters in respect of a shape model. The generic viewing parameters may also comprise one or more transfer function parameters in respect of an image model. Such transfer function parameters may include brightness, contrast, window width, window level, gamma level, etc., for example as a function of the average intensity level in the image or part of the image. The image-specific set of parameters may be specific to a local portion of the image. For example, a set of generic viewing parameters may be converted to image-specific parameters which vary across the image in dependence on local image content.

An indicating means may be provided for indicating to a user an image finding to which the view of the medical image is directed. This allows the user to quickly know what to look for in a view of a medical image. The indication may be provided in the form of a text label, auditive cue, or a visual icon representing an image finding. Similarly or alternatively, the indicating means may be arranged for indicating to a user the suspected diagnosis associated with the view of the medical image.

The mapper 3 may be arranged for generating an ordered list of sets of viewing parameters. The view generator 8 may be arranged for providing respective views of the medical image in accordance with the respective sets of viewing parameters, in the order defined by the ordered list. This helps to improve the workflow by sorting the views in an order which allows efficient review by a clinician.

Figure 2:
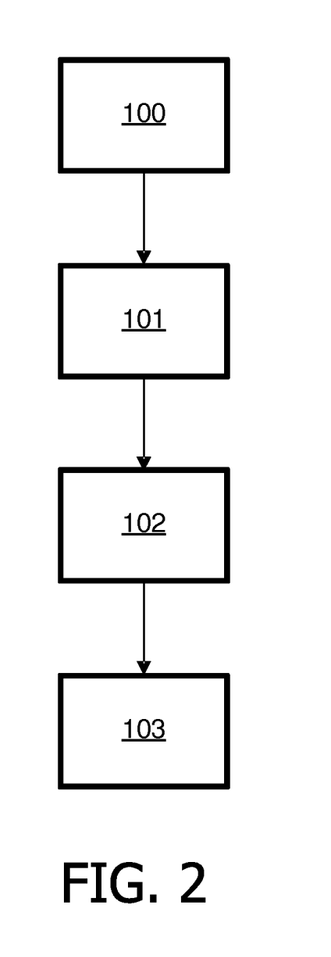
FIG. 2 shows a block diagram representing a method of generating a view.

FIG. 2 illustrates a method of generating a view of a medical image. Step 100 includes receiving information relating to a suspected diagnosis of a patient. Step 101 includes receiving a medical image of the patient. Step 102 includes mapping the suspected diagnosis of the patient to a set of viewing parameters for viewing the medical image. Step 103 includes providing a view of the medical image in accordance with the set of viewing parameters. The method is suitable for being implemented in a computer program product.

To generate the viewing parameters, a system for providing a view of a medical image may allow to be queried using information about hypothesized disorders and/or other view-relevant information, such as the applied respective imaging protocols when the data has been acquired. The system may then provide a (possibly ordered) list of views and corresponding viewing parameter sets that are defined with respect to reference models. Then, the reference models may be adapted (automatically or semi-automatically) to the actual patient image data sets, and the resulting adaptation parameters may be used to adapt the viewing parameter sets to the patient data. The adapted viewing parameters may be used to generate the respective views.

The information used to perform the described mapping may include a plurality of possible hypotheses (in particular hypothetical diagnoses) with associated image findings and/or viewing parameters. This information may be stored in a database.

For example, viewing parameter sets may be automatically retrieved for reading an imaging study of a patient with symptoms including visual loss. We assume that a radiologist is requested to perform and examine a medical image, for example a brain MRT1W scan, of this patient, under the hypothesis that there might be an optic nerve disorder or an optic nerve sheath disorder.

The hypotheses "optic nerve disorder" and "optic nerve sheath disorder" may be used to query the system which may perform the mapping from diagnostic hypotheses to views. For example, this system may comprise a database that also contains possible image findings. Moreover, the system may comprise a formal description of viewing parameter sets corresponding to such possible image findings or hypothetical diagnoses. For example, for "optic nerve disorder" or "optic nerve sheath disorder" the database may contain a list of entries such as shown in Table 1. According to the entries in the table the system may respond with a list of views. A view may be characterized by, for example, projection information and/or additional parameters such as window/level parameters. Geometric viewing parameters may be provided with respect to a standard anatomical reference model (for example a model of the centerline of the optic nerve of a human) and a standard projection specification may be provided with respect to the model (for example corresponding to an axial, sagittal, or coronal view of the optic nerve). Transfer function parameters, such as window/level viewing parameters, may be given with respect to predetermined properties of a reference image (for example, histogram data may be collected of an image for which desirable transfer function parameters are given). Viewing parameters may be provided for different projection methods such as Maximum Intensity Projection (MIP) or Direct Volume Rendering.

Viewing parameters may be provided with respect to different models. For example, window/level settings may be given in Hounsfield units for CT data and in respect of a mean intensity level in the image for MR data. Viewing parameters defining a projection matrix may be defined with respect to a specific coordinate system, such as a well-defined acquisition coordinate system.

An ordered list of views may be provided by the system. These views may each be associated with different sets of viewing parameters. These different sets of viewing parameters can relate to the same model or to different models. For example, a list of views may be ordered according to the probability of the occurrence of a respective disease sub-category, or the urgency of the diagnosis of a respective disease sub-category. Such probability or urgency may be quantified and/or displayed to the user. Also, information about the expected image findings to be searched for in a view can be exposed to the user of the system, e.g. as annotations of the generated view.

The matching of the generic view parameters to the patient's image data may be performed automatically, for example by means of automatic model-based segmentation. In the example of viewing parameters defined with respect to the optic nerve, a shape-model comprising a surface model of the visual pathway (including for example the globe, optic chiasm, optic nerves and/or optic tracts) may be adapted to the patient data. This surface model (which may include information about how this model can be adapted to patient image data acquired by a particular protocol) can also be provided as a reference model by the system. The model adaptation may result in an annotation of the patient's image data indicating the structures of the visual pathway. A geometric representation of the centerlines of the main sections of the patient's optic nerve can be obtained automatically from this annotation. Similarly, axial/sagittal/coronal projection directions can be derived from the adapted model. Then, to generate a view, the projection matrix as provided by the database may be adapted to the patient data. For example, to generate the first of a series of 5 equidistant coronal oblique views vertical to the centerline of the left optic nerve, the corresponding centerline extracted from the patient's data by model-based segmentation may be divided in 5 equidistant intervals. Then a view of the first interval may be defined as a plane vertical to the centerline direction at the starting point of the first interval with a fixed geometric extension, e.g. 5×5 cm (as defined in the view description returned by the database). The resulting (patient-specific) projection matrix may be multiplied by the (generic) projection matrix provided by the database, resulting in hypothesis-specific and patient-adapted projection information. To generate a slice view of MR data, a render engine may use additionally a patient-adapted window/level parameter set. To this end it is possible to calculate a histogram of the patient's image data and automatically match it to the reference histogram provided by the database by applying a range of affine transformations to the histogram limits and minimizing the square root error. The best matching affine transformation may be applied to the window/level parameters on the respective view, resulting in patient-adapted window/level parameters.

Other kinds of descriptions of views may be stored in the database. For example, it is possible to define parameters which can be used for generating video sequences. Also, it is possible to define fused views involving multiple image datasets, possibly acquired using different imaging modalities. Also, it is possible to define a view combining the data of one patient with the data of another patient. It is possible to provide a complete viewing workflow. For example, it is possible to define which view should be generated, including labels as to which anatomy should be looked at in particular, indicate which image findings are normal and which are abnormal, or which measurements have to be performed, etc. In a query the database may allow not only hypotheses and/or properties of the patient's image data to be given, but also model references with respect to which the database should return its view specifications.

Figure 3:
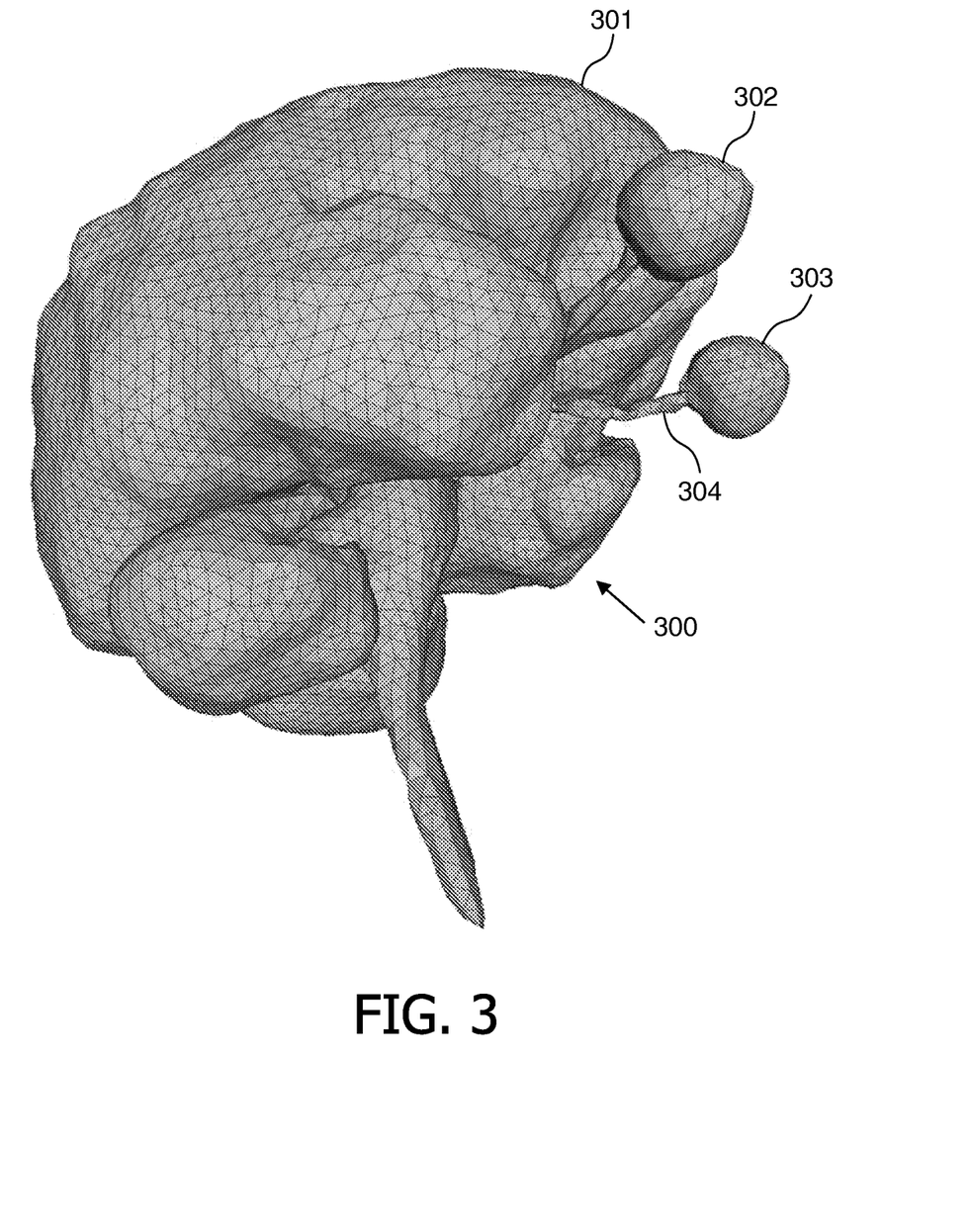
FIG. 3 shows a visualization of an example of a shape model.
Figure 4:
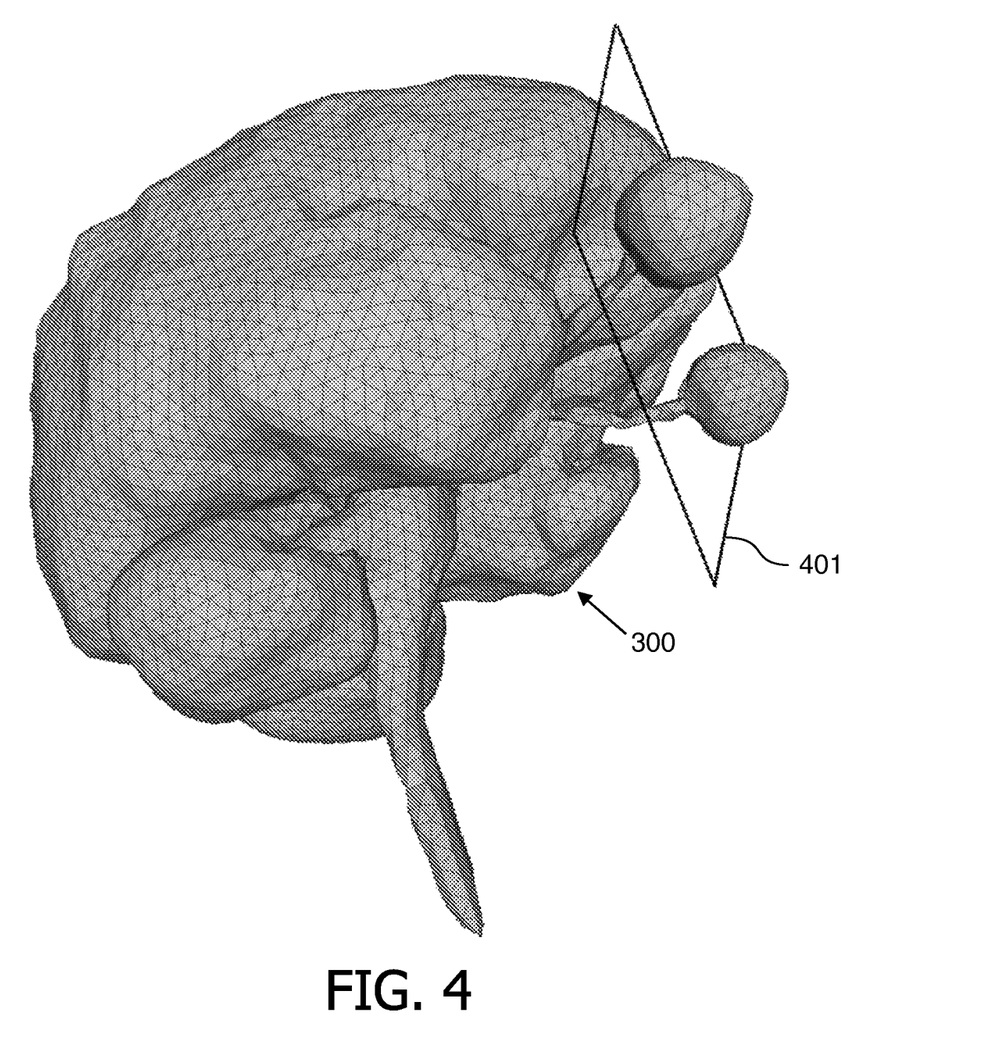
FIG. 4 shows a cut plane defined in respect of the shape model.
Figure 5:
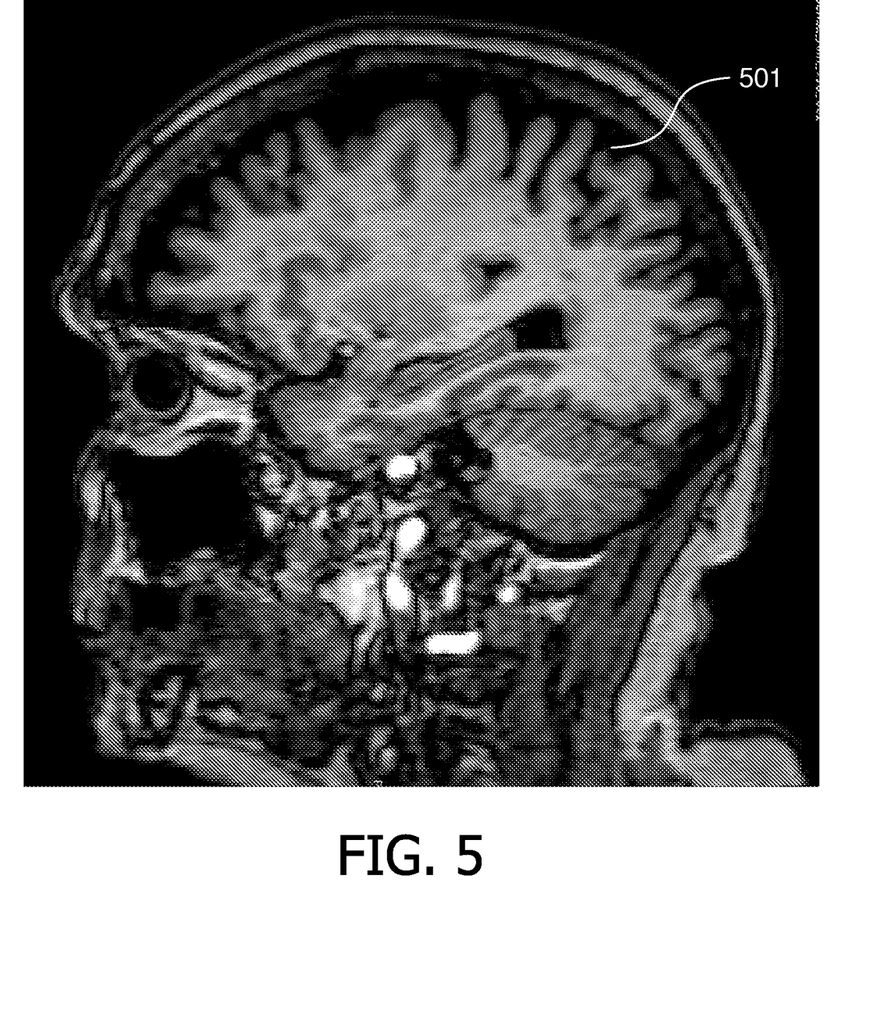
FIG. 5 shows a sagittal slice of an MR brain image.
Figure 6:
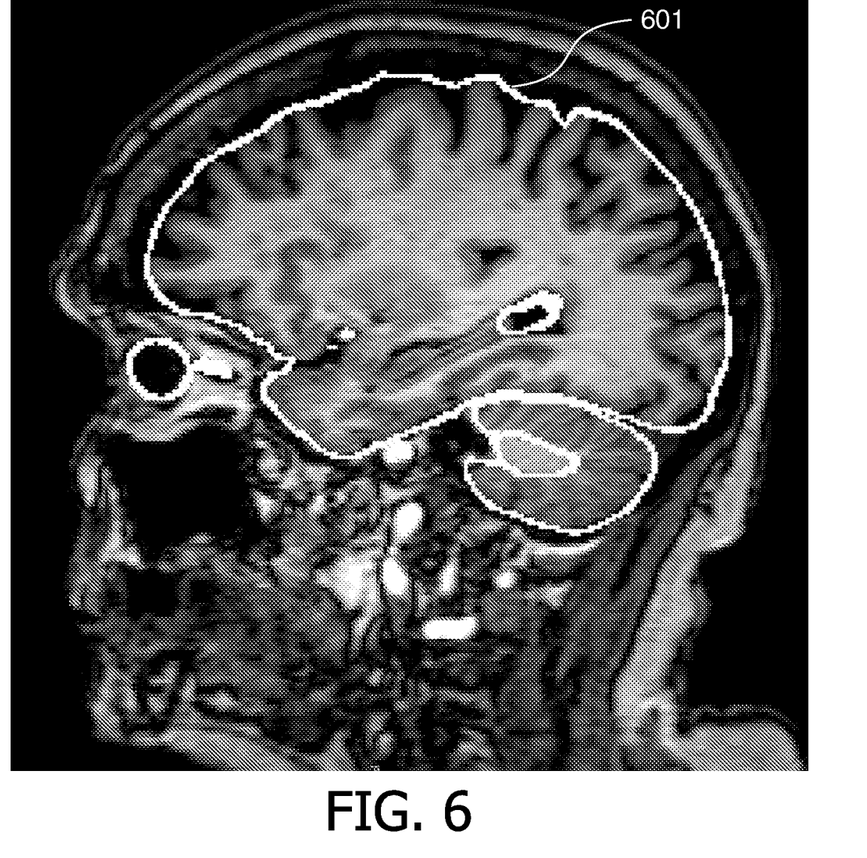
FIG. 6 shows the shape model fitted to the MR brain image.
Figure 7:
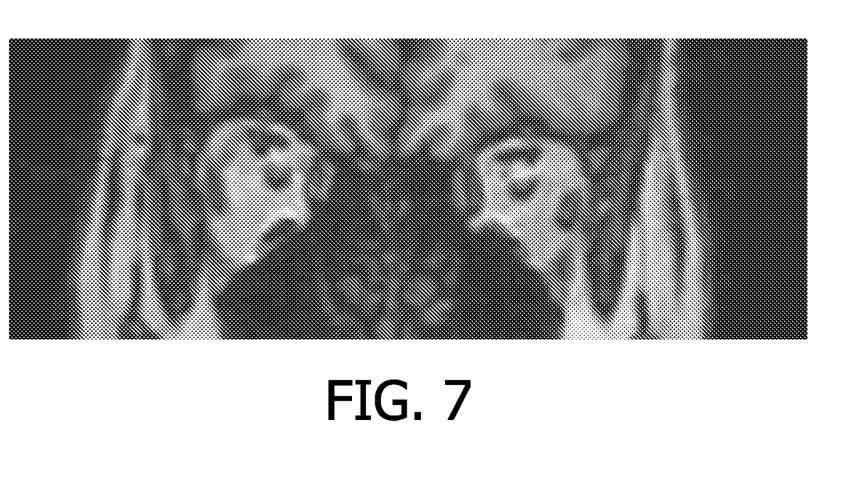
FIG. 7 shows an intersection of the MR brain image corresponding to the cut plane defined in respect of the shape model.

FIG. 3 through FIG. 7 illustrate an example application of the system set forth to a brain MR dataset. Like items are identified with the same reference numerals. FIG. 3 illustrates an image model comprising an adaptive shape model 300 of the brain 301, the optic nerves 304, and the eyeballs 302 and 303. FIG. 4 illustrates the concept of a set of generic viewing parameters defined in respect of an image model, in particular the adaptive shape model 300. The generic viewing parameters define a cut plane 401 in respect of the adaptive shape model 300. For example, the generic viewing parameters are indicative of a point on the cut plane 401 and a normal vector of the cut plane 401, in respect of a point of the adaptive shape model 300. FIG. 5 illustrates a two-dimensional slice of a three-dimensional medical image including a brain 501. Only one slice of the many slices making up de three-dimensional medical image is reproduced in the Figure, as the Figure only serves for illustrative purposes. However, the techniques disclosed therein may also be applied to two-dimensional images. The adaptive shape model 300 may be adapted to the medical image shown in FIG. 5, by applying one or more geometric transformations to the adaptive shape model 300. The process of adapting an adaptive shape model to a particular medical image is known in the art. By recording the adaptations made to the adaptive shape model in the process of adapting, a set of adaptation parameters may be obtained. FIG. 601 illustrates the slice of the medical image with the adapted model 601, which represents the adaptive shape model 300 adapted to the medical image. Again, only a two-dimensional slice of the medical image and adapted model 601 is shown in the Figure. Based on the adaptation parameters, the generic viewing parameters defining the cut plane 401 may be adapted to the medical image. For example, if a rotation and/or a translation of the adaptive shape model 300 has been performed to obtain the adapted shape model 601, similar rotation and/or translation operations may be performed to the cut plane 401. When the adaptive shape model 300 is adapted in a non-rigid way, the cut plane may be adapted such that it remains fixed to some particular anchor points defined in the adaptive shape model. FIG. 7 shows a resulting cut plane corresponding to the cut plane 401 when applied to the medical image of FIG. 6 after applying the adaptation parameters to the parameters defining the cut plane 401.

Table 1 lists a few examples of database entries. In such a database entry, a hypothesis (e.g. a hypothetical or potential diagnosis of a patient whose medical image data is being reviewed) is associated with one or more image findings. An image finding is associated with one or more view descriptions. In an actual system, a formal description of views using parameter values is provided. In Table 1, the formal descriptions of the views are omitted and replaced by a verbal description.

TABLE 1

A few examples of database entries.

| Hypothesis | Image finding | View description |
|---|---|---|
| Optic nerve tumor | Fusiform homogeneous enhancement | Axial projection in plane containing optic nerve (e.g. as projection matrix with respect to the plane defined by the centerlines of the optic nerves/optic tracts) Series of coronal oblique views (e.g. as a set of 5 projection matrices vertical to the centerline of each of the left and right optic nerve section at equidistant locations) Window/Level to cover optic nerve grey-value range/tumor enhancement (e.g. by window/level set for reference image with reference histogram) |
| Optic nerve tumor with Neurofibromatosis type I | Optic nerve elongation, kinking of nerve posterior to the globe (neurofibromatosis type I) | Oblique sagittal projections in planes containing optic nerve sections (e.g. as a set of 2 projection matrices, each projection displaying one of the left/right optic nerve centerlines) Window/Level to cover optic nerve grey-value range/globe grey-value range (e.g. by window/level set for reference image with reference histogram) |
| Optic nerve menigioma | Cuff-like enhancement, surrounding the optic nerves with intact nerve | Series of coronal oblique views, vertical to centerline of optic nerve section (e.g. as a set of 5 projection matrices vertical to the centerline of each of the left and right optic nerve section at equidistant locations) |
| | Eccentrically located enhancement on one side of the optic nerve | Axial projection in plane containing optic nerve (e.g. as projection matrix with respect to the plane defined by the centerlines of the optic nerves/optic tracts) Window/Level to cover optic nerve grey-value range/enhancement (e.g. by window/level set for reference image with reference histogram) |

The system set forth can be implemented, for example, in a PACS system, in a server that stores diagnostic information, or in a medical workstation.

It will be appreciated that the invention also extends to computer programs, particularly computer programs on or in a carrier, adapted for putting the invention in practice. The program may be in the form of source code, object code, a code intermediate source and object code, such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more, or all, subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or stored in one or more files that may be linked statically or dynamically. Another embodiment relating to a computer program product comprises computer executable instructions corresponding to each of the means of at least one of the systems and/or products set forth. These instructions may be subdivided into subroutines and/or stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further, the carrier may be a transmissible carrier such as an electrical or optical signal, which may be conveyed via electrical or optical cable or by radio or other means. When the program is embodied in such a signal, the carrier may be constituted by such a cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for generating a view of a medical image, comprising:
    a database which stores mappings of suspected diagnoses into sets of generic viewing parameters, the generic viewing parameters including a geometric parameter based on one of (1) an image model, (2) a standard anatomical reference model and (3) a shape model;
    a processor configured for:
        receiving information indicative of suspected diagnoses of a patient;
        receiving a medical image of the patient;
        transforming each set of generic viewing parameters received from the database into a set of image-specific viewing parameters based on anatomical structures of the medical image, wherein the image-specific viewing parameters vary across the image in dependence on local image content;
        generating an ordered list of sets of image-specific viewing parameters; and
        causing a display device to display respective views of the medical image in accordance with the respective sets of image-specific viewing parameters, in an order specified by the ordered list,
    wherein the set of generic viewing parameters are independent of the patient and the medical image of the patient.

2. The image processing system of claim 1, wherein the generic viewing parameters are defined in respect of the image model, and the processor is further configured for:
    adapting the image model to the medical image, for obtaining a set of adaptation parameters; and
    adapting the set of generic viewing parameters to the set of image-specific viewing parameters, based on the set of adaptation parameters.

3. The image processing system of claim 1, wherein the processor is further configured for controlling the display to indicate to a user an image finding to which the view of the medical image is directed.

4. The image processing system of claim 1, wherein the processor is further configured for controlling the display to indicate to a user a suspected diagnosis associated with the view of the medical image.

5. The image processing system of claim 1, wherein the generic viewing parameters further including viewing information including at least one of image processing techniques, a relevant view, a specific cross-sectional plane of an image, brightness, contrast, window width, window level, gamma level, projection image direction, and a combination of medical diagnostic images from different imaging modalities.

6. The system of claim 1, wherein the processor is further configured for providing an indication to a user of an image finding to which the view of the displayed image is directed.

7. The system of claim 1, wherein the processor is further configured for:
    providing an indication to the user of what to look for in the displayed view of the medical image.

8. The system of claim 1, wherein the database associates each of a plurality of suspected diagnoses with an image finding indicative of what to look for in a displayed image and a view description indicative of which one or more views is to be displayed.

9. A method of generating a view of a medical image, comprising
    receiving information relating to a suspected diagnosis of a patient;
    receiving a medical image of the patient;
    retrieving a set of generic viewing parameters corresponding to the suspected diagnosis, the generic viewing parameters including a geometric parameter based on one of (1) an image model, (2) a standard anatomical reference model and (3) a shape model, wherein the set of generic viewing parameters are independent of the patient and the medical image of the patient;
    transforming the retrieved generic viewing parameters into a set of image specific viewing parameters for viewing the medical image, wherein the image-specific viewing parameters vary across the image in dependence on local image content; and
    generating an ordered list of sets of image-specific viewing parameters;
    on a display device, providing respective views of the medical image in accordance with the set of image-specific viewing parameters in an order specified by the ordered list.

10. A non-transitory computer-readable medium carrying computer executable instructions for causing a computerized system to perform the method according to claim 9.

11. A system for recommending whether a proposed diagnosis is accurate, the system comprising:
    a database which provides for each of a plurality of proposed diagnoses at least one specific slice of a generic patient image model including an orientation and a location of the specific slice;
    a medical image storage which stores at least one diagnostic image of a patient being diagnosed;
    a computerized system which receives the proposed diagnoses generates an ordered list of slice views in order by a probability of occurrence or an urgency of the proposed diagnoses, accesses the database to retrieve the at least one specific slice of the generic patient image model, including the location and the orientation, and controls a view generator to generate at least one slice view of the diagnostic image of the patient stored in the medical image storage, wherein the at least one diagnostic image slice view corresponds to the at least one generic patient image model specific slice; and
    a display configured to display the generated corresponding slice views in an order specified by the ordered list.

12. The system of claim 11, wherein the computerized system further controls the view generator to generate at least one of a label, auditive cue, or visual icon prompting a user what to look for in the displayed slice view.

* * * * *